United States Patent [19]
Miller

[11] 3,883,148
[45] May 13, 1975

[54] TRAILER TANK
[75] Inventor: Norman T. Miller, Modesto, Calif.
[73] Assignee: Certified Stainless Services, Ceres, Calif.
[22] Filed: Feb. 11, 1974
[21] Appl. No.: 441,269

[52] U.S. Cl. .................. 280/5 C; 105/358; D12/95
[51] Int. Cl. ............................................... B60p 3/22
[58] Field of Search ................. 280/5 C, 5 E, 5 R; 105/358, 360; 222/176; 220/DIG. 24; D12/95; 302/52

[56] References Cited
UNITED STATES PATENTS

| 2,011,076 | 8/1935 | Prescott | 105/360 X |
| 3,013,695 | 12/1961 | Caldwell | 222/1 |
| 3,081,104 | 3/1963 | Schmiermann | 280/5 C |
| 3,194,442 | 7/1965 | Sjoblom | 222/176 |
| 3,212,824 | 10/1965 | Emery et al. | 280/5 C X |
| 3,228,466 | 1/1966 | Carleton | 280/5 E X |

Primary Examiner—Leo Friaglia
Attorney, Agent, or Firm—Jack M. Wiseman

[57] ABSTRACT

A trailer tank for transporting materials having fluid characteristics, the outer shell of the tank having generally rounded ends, a smooth transition from the rounded ends to a generally elliptical midsection with relatively steep side walls for fast drainage, the bottom section being approximately V-shaped in side elevation and provided with a discharge opening at the lowermost point.

7 Claims, 5 Drawing Figures

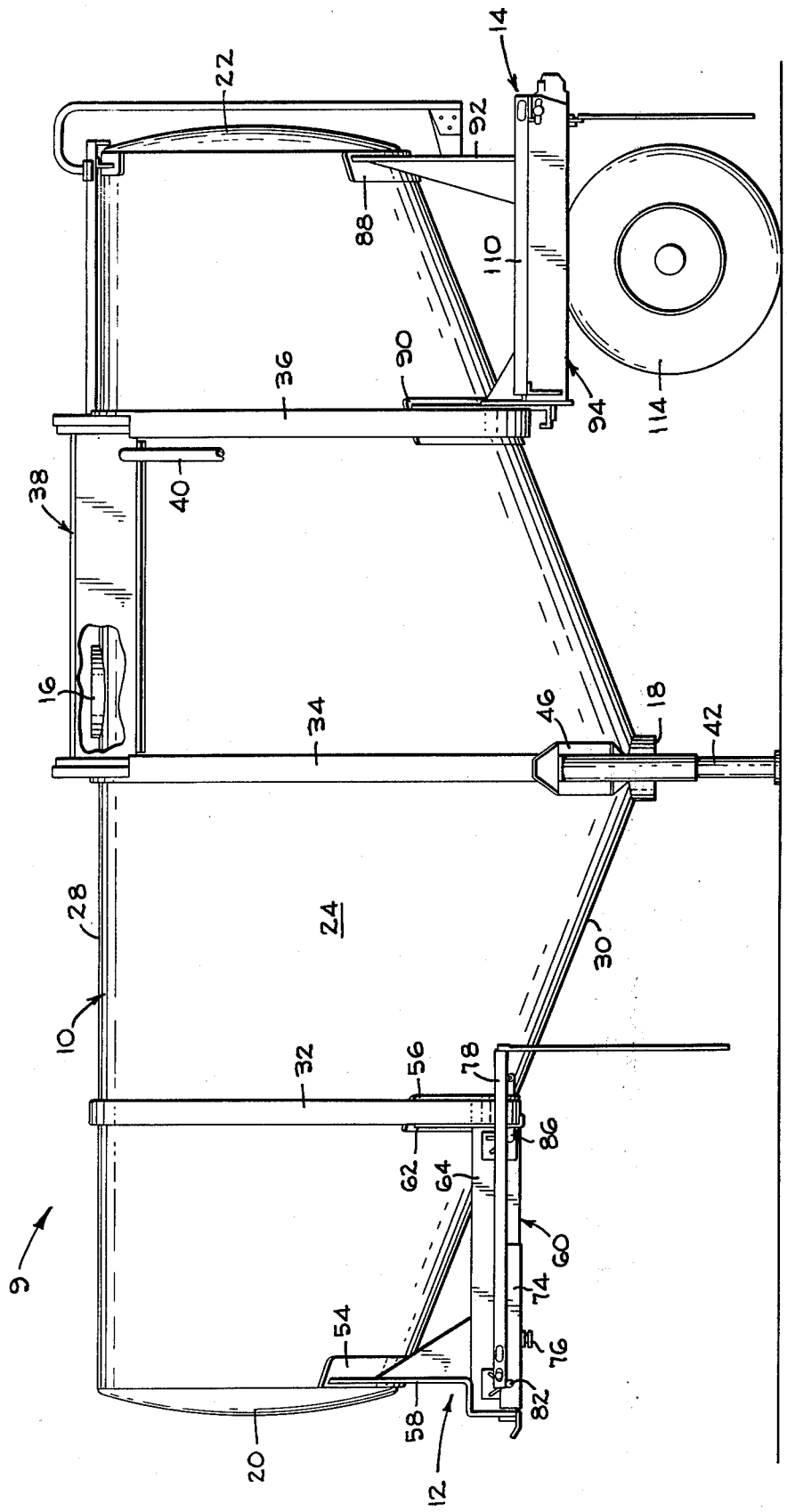

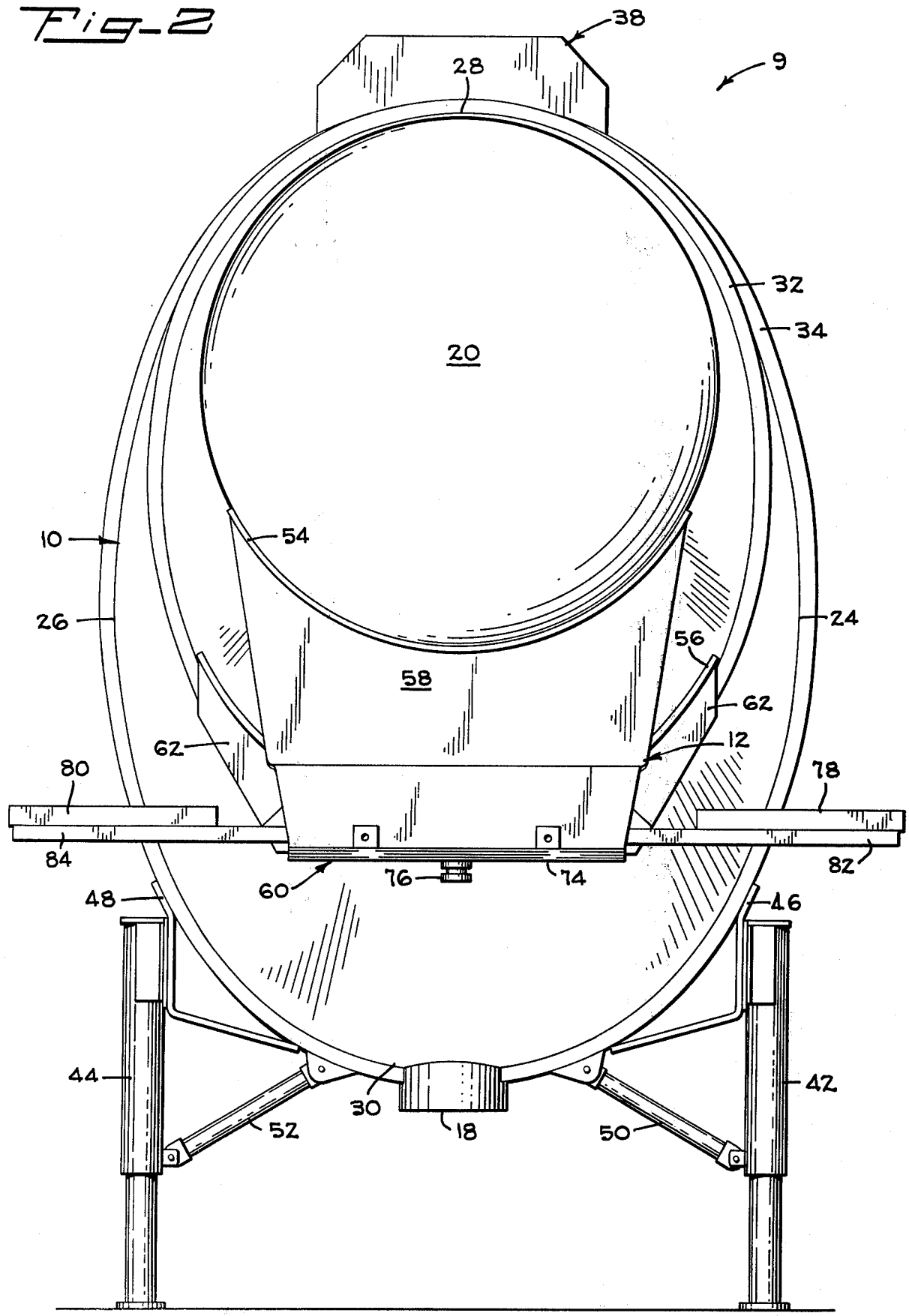

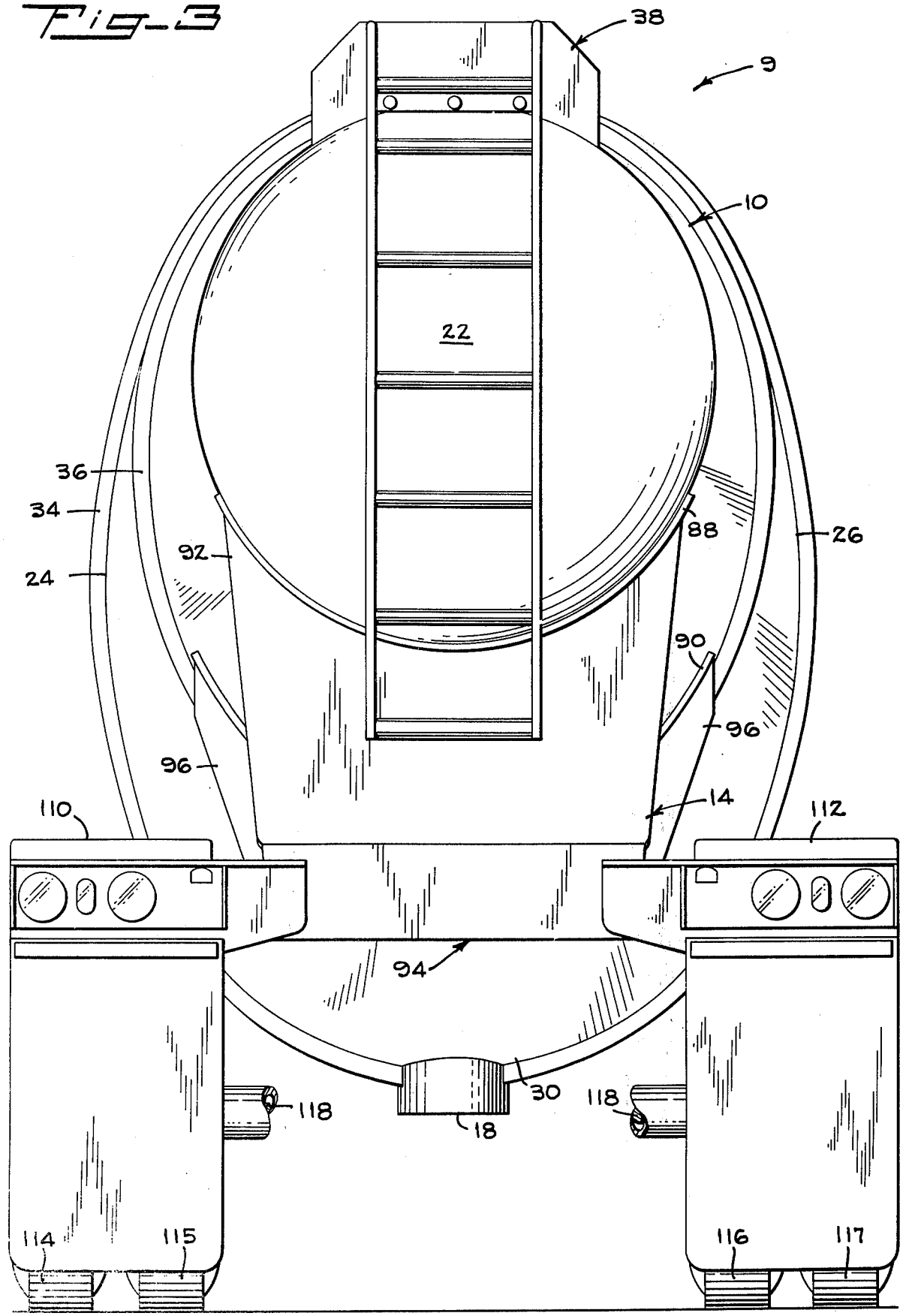

TRAILER TANK

BACKGROUND OF THE INVENTION

1. Field of the Invention

This invention relates generally to a trailer tank for transporting materials having fluid characteristics and more particularly to a novel configuration for a multipurpose bulk hauler which is capable of transporting liquid or dry flammable or nonflammable materials.

2. Prior Art

One of the major problems encountered by trailer tanks which are transporting liquid materials of the adverse effects that result from the movement of the liquid mass within the bulk tank. The forces created by the movement of such a liquid mass within a tank are generally known as "surge." The effects of surge tend to decrease as the filled volume of the tank is increased. However, the majority of these trailer tanks are employed for transporting a variety of commodities which vary considerably in weight and such tanks are generally designed to accommodate a maximum gross weight. Accordingly, a compromise must often be achieved between filling the tank to its maximum capacity to reduce the effects of surge and maintaining the weight of the material being transported below the maximum limit.

The surge forces which concern the operator of the trailer tank are those which occur in the horizontal plane. These forces have a significant effect in both a transverse and a longitudinal direction. Transverse surge forces cause loss of directional control and can result in roll-over of the trailer tank. Longitudinal surge forces cause braking variations which are difficult to predict and overcome by the driver-operator.

Transverse surge has been generally accepted as a hazard of the industry and no reasonably effective cure within the limits of practicality has been found for its effects except for the experience and skill of the operator in dealing with such effects. Forces resulting from longitudinal surge have been dampened by the use of baffles mounted within the tank's structure. Such baffles are generally mounted transversely of the tank and spaced from 4 to 10 feet apart. Generally, such baffles are provided with a crawl hole in the center and an opening at the top and bottom to permit loading and unloading of the cargo.

In the hauling of bulk liquids, one of the most frequent and costly problems encountered is the unloading and cleaning time involved in the operation of a trailer tank. As the amount of idle time for a piece of equipment is reduced, the revenue it yields for its owner increases. Conventional trailer tanks are designed with a uniform shape from one end to the other with usually either a round or an oval cross-section. Drainage is accomplished by either slightly sloping the tank from one end to the other end or through the use of tapered troughs mounted in the belly of the tank. Sloping a tank to achieve drainage results in variations of the weight distribution on the axles, particularly when the tank is "down loaded" with the heavier than usual commodities. Troughs are expensive to build and install in a tank and are extremely difficult to clean thoroughly. Viscous products respond relatively slowly while draining to such gradual slopes in the tank sides and bottom. Because of the conforming shape of a conventional design, the distance from an end to a discharge point of a tank is generally great, causing additional resistance to the discharge of the viscous products.

The adaptability of trailer tanks to various uses and their conformance to certain specifications has been a problem, particularly with many radical or relatively new designs. Generally, a tank which is designed to transport liquids is incapable of handling dry products. Certain design requirements which must be met for handling a specific type of liquid may result in a tank which is not acceptable for hauling other kinds of products such as flammable or corrosive products.

Most conventional transport tank configurations have relatively large and flat or semi-flat areas of sheet metal in their bottom section which are unstable and tend to buckle from stresses imposed by concentrated load bearing members. Such areas are also subject to deformation when products which are loaded into the tank are of a much higher temperature than the temperature of the tank shell.

In an effort to overcome structural failures in a trailer tank, additional reinforcing members are added which increase the weight of the tank. Any increase in the weight of a trailer tank decreases the amount of material which can be transported, thereby reducing revenues. Furthermore, relatively large frontal areas of high-mounted, flat-fronted tankers result in an undue amount of wind resistance which not only requires more power and fuel to maintain a desired speed, but also increases instability and handling problems of the equipment.

A straight section or a semi-straight section tank design dictates that the entire tank and the lading be above the running gear a distance sufficient to accommodate a sub-frame structure and to allow for the steering axles to rotate under such a sub-frame. Such a configuration results in a relatively high center of gravity. Such a high center of gravity, or roll, combined with a lack of transverse surge control, creates the instability which accounts for a relatively large loss to the industry due to accident repair and, in many cases, the loss of life and equipment.

SUMMARY OF THE INVENTION

Accordingly, it is a primary object of the present invention to provide a trailer tank configuration which permits hauling a wide variety of materials all presenting a relatively high degree of stability.

Another object of the present invention is to provide a trailer tank configuration which is capable of reducing the effects of surge, thereby increasing the directional control and stability.

Still another object of the present invention is to provide a trailer tank configuration which permits relatively rapid discharge of the materials contained therein.

A further object of the present invention is to provide a trailer tank configuration which is relatively easy to clean the residue of any materials previously contained therein.

Yet another object of the present invention is to provide a trailer tank which has a higher strength to weight ratio, thereby increasing the permissible load which can be transported.

Still another object of the present invention is to provide a trailer tank configuration which has a relatively high resistance to heat deformation and which provides strength in the critical load bearing sections.

A further object of the present invention is to provide a trailer tank configuration which has a relatively low center of gravity, thereby increasing the stability of the tank.

Another object of the present invention is to provide a trailer tank configuration which has a relatively low wind resistance, thereby reducing the fuel consumption and increasing its stability.

These and other objects of the present invention are attained by the provision of an outer shell which forms an enclosure for receiving the materials to be transported, which outer shell has generally rounded ends and a smooth transition to a generally elliptical midsection, with a bottom wall section being approximately V-shaped. A feature of the present invention resides in the provision of side wall sections of the shell which have a greater radius of curvature than that of the bottom wall, such that a relatively large extent of vertical wall section is presented to the contained material in relation to the extent of the bottom wall section. A further feature of the present invention resides in the provision of relatively steeply sloped bottom wall sections terminating in their lowermost point in a discharge opening. A related feature of the present invention resides in the provision of end sections of the shell being supported a sufficient distance above ground level to accommodate the undercarriage structure and running gear, while having a mid-section of the shell extending below that level without interfering with the running gear, thereby providing a larger volume within the shell.

Still another feature of the present invention resides in the provision of external structural members for supporting the shell against internal forces created by the contained material.

A trailer tank or similar structure for transporting material having the above-described configuration and features provides a number of distinctive advantages. One advantage realized by a trailer tank constructed in accordance with the present invention is the greater degree of stability which can be achieved while transporting materials having fluid characteristics. Another advantage of such a trailer tank is that it is more economical to operate and, due to various factors, will generate a greater revenue.

These and other objects, features, and advantages of the present invention, however, will be more fully realized and understood from the following detailed description, when taken in conjunction with the accompanying drawings, wherein:

BRIEF DESCRIPTION OF THE DRAWINGS

FIG. 1 is a side elevational view, partially broken away, of a trailer tank constructed in accordance with the present invention.

FIG. 2 is a partial front elevational view of the trailer tank illustrated in FIG. 1.

FIG. 3 is a partial rear elevational view of the trailer tank illustrated in FIG. 1.

Certain structure elements shown in some of the figures are not shown in others for purposes of clarity of illustration. Like reference numerals throughout the various views of the drawings are intended to designate the same or similar elements.

DETAILED DESCRIPTION OF THE PREFERRED EMBODIMENT

Figure 5:
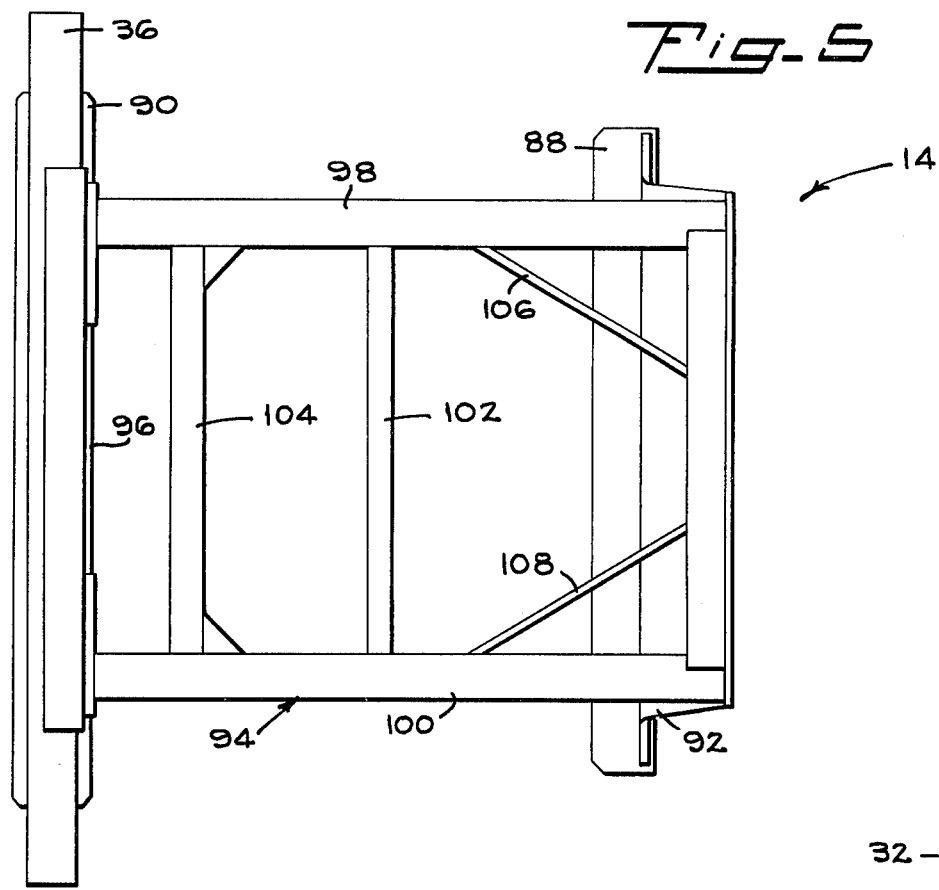
FIG. 5 is a bottom view of the support structure for the trailing end of the trailer tank illustrated in FIG. 1.

Illustrated in FIGS. 1–5 is a trailer tank 9 for transporting materials having fluid characteristics, which trailer tank 9 is constructed in accordance with the present invention. As shown therein, the trailer tank 9 of the present invention includes a shell, generally designated with the reference numeral 10, for receiving and enclosing the material to be transported, an undercarriage assembly 12 for supporting the leading end of the shell 10, and an undercarriage assembly 14 for supporting the trailing end of the shell 10 on appropriate running gear. The shell 10 is provided with an opening in its top wall which is closed by a hatch cover 16 that is disposed for receiving the materials to be transported and to be contained within the shell 10. An outlet flange 18 is mounted at the lowermost point of the bottom wall of the shell 10 and surrounds an outlet opening through which the material contained within the shell 10 can be discharged.

The shell 10 is generally formed of a leading wall 20, a trailing end wall 22, sidewall sections 24 and 26, a top wall section 28 and a bottom wall section 30. As shown on FIGS. 1, 2 and 3, the end walls 20 and 22 have a configuration corresponding to a segment of a sphere. The respective ends of the sidewall sections 24 and 26, the top wall section 28, and the bottom wall section 30 are approximately circular at the junctions with the end walls 20 and 22. In a longitudinal plane, the top wall section 28 is straight or flat and the bottom wall section 30 is V-shaped, with the discharge flange 18 mounted at the lowermost area thereof.

As shown in FIGS. 2 and 3, the side wall sections 24 and 26, the top wall section 28, and the bottom wall section 30, in a transverse cross-section, are approximately circular at their respective ends and extend in a smooth transition to an elliptical shape. The sidewalls 24 and 26 have a greater radius of curvature than that of the top wall section 28 and the bottom wall section 30, since the major axis of the elliptical configuration is vertical. Structural reinforcing members 32, 34 and 36 are mounted on an outer surface of the shell 10 and are spaced apart in the longitudinal direction. The members 32, 34 and 36 are channel members which extend around the periphery of the shell 10 and are secured thereto by any suitable means, such as welding. The use of the reinforcing members 32, 34 and 36 obviates the necessity for any internal reinforcing members within the shell 10.

On the top wall section 28 between the reinforcing members 34 and 36 is a catch basin, generally designated with the reference numeral 38. A drain tube 40 extends from a wall of the catch basin 38 and permits the drainage of fluid materials therefrom. As shown in FIGS. 1 and 2, jacks 42 and 44 are provided for supporting the tank when the running gear is detached from the leading undercarriage assembly 12. A pair of brackets 46 and 48 is mounted on the reinforcing member 34 and supports the upper ends of the jacks 42 and 44, respectively, and arms 50 and 52 extend from the bottom wall section 30 to the jacks 42 and 44, respectively.

Figure 4:
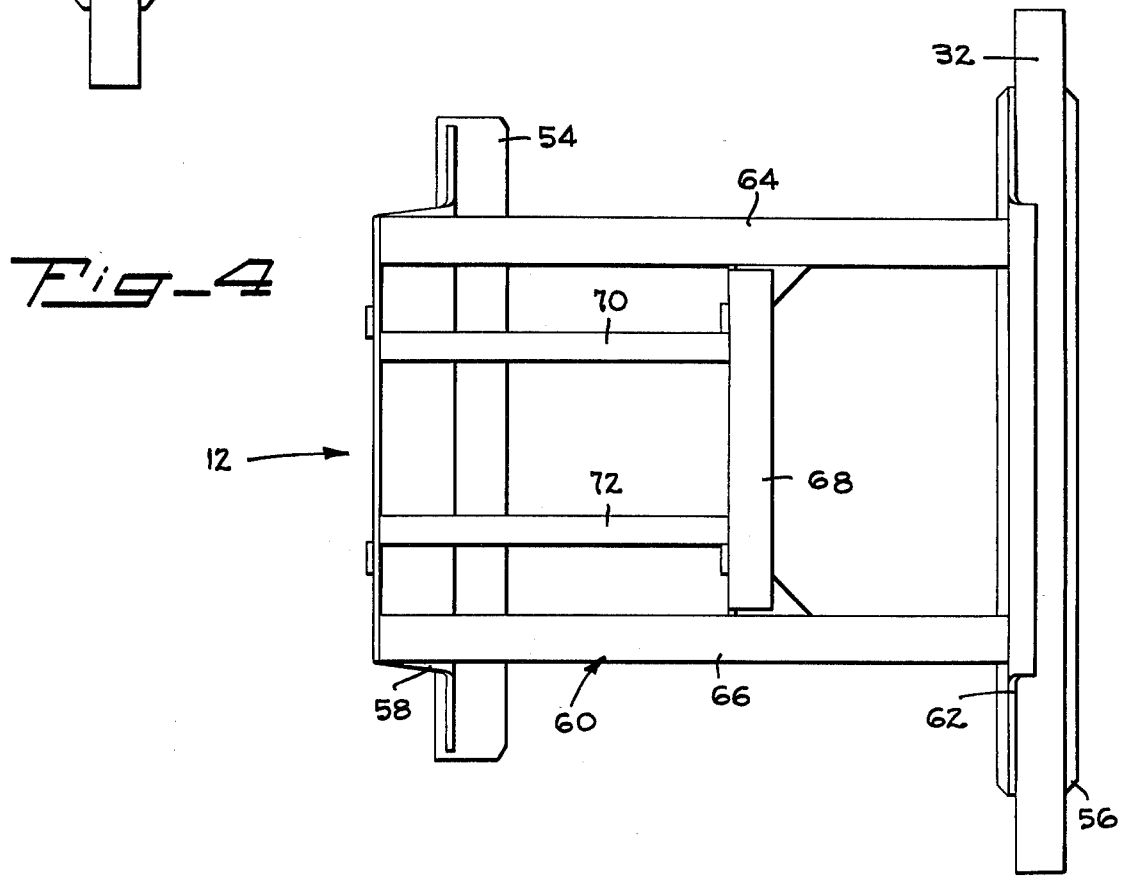
FIG. 4 is a bottom view of the support structure for the leading end of the trailer tank illustrated in FIG. 1.

The undercarriage assembly 12 is shown in FIGS. 1, 2 and 4 and includes a pair of pads 54 and 56 which have a contour conforming to the shape of the respective outer surfaces of the shell 10 and are secured thereto by suitable means, such as welding. A support member 58 is secured to the pad 54 and is mounted on a frame which is generally designated with the reference numeral 60. A support member 62 is secured to the pad 56 and is also mounted on the frame 60. As shown more clearly in FIG. 4, the frame 60 includes longitudinal extending channel members 64 and 66 which are joined together by a channel member 68, and a pair of channel members 70 and 72 extending from the member 68 to the support member 58. The channel members 64 and 66 are secured at the respective ends to the support members 58 and 62. As shown in FIGS. 1 and 2, but not in FIG. 4, a plate 74 extends between and is secured to the channel members 64 and 66 and extends from the channel member 68 to an end of the support member 58. A hitch element 76 is secured to the plate 74 and is disposed for being engaged by appropriate structure on a tractor. If desired, the frame 60 can be provided with any well known hitch structure for permitting the tank to be pulled by a tractor. It can also be appreciated that the frame 60 can be provided with suitable structure for receiving running gear.

As shown in FIGS. 1 and 2, a pair of fenders 78 and 80 is mounted at the forward ends on rods 82 and 84, respectively, which are, in turn, secured to the frame members 64 and 66, respectively. As shown in FIG. 1, a rod 86 is secured to the rearward end of the frame 64 and supports the trailing end of the fender 78. A rod, not shown, similar to the rod 86, is provided for the trailing end of the fender 80.

The trailing undercarriage assembly 14 is illustrated in FIGS. 1, 3 and 5 and includes a pair of pads 88 and 90 which pads have a contour conforming to the shape of an outer surface of the shell 10 and are secured thereto by any suitable means, such as welding. A support member 92 is secured to the pad 88 and is mounted on a frame which is generally designated with the reference numeral 94. A support member 96 is secured to the pad 90 and is mounted at the other end of the frame 94. As shown more clearly in FIG. 5, the frame 94 includes a pair of longitudinally extending channel members 90 and 100 which are secured at their respective ends to the support members 92 and 96. In addition, the frame 94 includes a pair of structural members 102 and 104 which extend between and are secured to the channel members 90 and 100. A bracket 106 is secured between the channel member 98 and the support member 92 and a bracket 108 is secured between the channel 100 and the support member 92. As shown in FIG. 3, the frame 94 is disposed for supporting a pair of fenders 110 and 112. In addition, the frame 94 is disposed for supporting a suspension system (not shown) for running gear which includes wheels 114–117 and an axle 118.

With the exception of the plate 74, all of the channel members, structural members and the pads of the undercarriage assemblies 12 and 14 are secured to one another and to the shell 10 by welding. In addition, the reinforcing members 32 and 36 encircle the pads 56 and 90, thereby providing a more rigid attachment of the respective undercarriage assemblies 12 and 14 to the shell 10. Some of the above-described structure and the structure which has been illustrated but not described are well known in the art and the specific details thereof are not needed for a thorough and complete understanding of the present invention.

The novel configuration of the shell 10 provides a number of distinctive advantages not realized by other trailer tanks, particularly in the handling of materials having fluid characteristics. The elliptical cross-sectional shape in a transverse plane of the sidewalls 24 and 26, the top wall 28, and the bottom wall 30 at all but their extreme ends dampens the transverse motion of any materials contained within the shell 10. That is, the relatively large extent of the sidewalls 24 and 26 in relation to the top wall 28 and the bottom wall 30 supports the contained material in a manner which tends to dampen transverse motion thereof. The V-shaped bottom wall section 30 dampens longitudinal motion of the contained material. Any longitudinal motion of the contained material encounters the sloping bottom wall section 30 which either rises or drops in the direction of motion. The effect can be compared to the effects of a beach as water flows thereover and recedes therefrom. Accordingly, it can be appreciated that the shape of the shell 10 serves to cause the movement of the contained material to dissipate its surge effects slowly or greatly resist the original surge motion, thereby preventing it from becoming a significant force. The reduction of the surge forces increases the operating stability of the trailer tank.

The shell 10 is reinforced entirely on its external surfaces by means of the reinforcing members 32, 34 and 36 and contains no internal reinforcing members or baffles. The elimination of such internal reinforcing members and baffles renders the tank assembly 9 of the present invention lighter than previously known trailer tanks, thereby permitting the hauling of larger payloads. Furthermore, the absence of baffles and internal structures renders the tank assembly 9 of the present invention significantly easier to clean internally when changing commodities. In the hauling of bulk materials, one of the most frequent and costly problems encountered is the amount of time involved in unloading and cleaning. The lesser the time that a piece of equipment is idler, the greater the revenue it generates for its owner. It can be readily appreciated that the V-shaped bottom wall section 30 and the relatively steep side walls 24 and 26 in relation to the small radius bottom wall section 30 in a transverse plane permits relatively rapid discharge of the materials contained within the shell 10. The absence of baffles and drain troughs combined with the above-described configuration assures the relatively fast, complete discharge and easy clean-out when handling the more viscous materials.

Most conventional transport tank configurations present large, semi-flat areas of shell metal in their bottom sections. These areas are relatively unstable and tend to buckle from stresses imposed by concentrated load carrying members or when materials are loaded thereon which are at a relatively high temperature. Because of the extremely small radius of the bottom wall section 30, the trailer tank 9 of the present invention resists deformation or buckling caused by such concentrated load bearing attachments or from loading relatively hot materials into a relatively cold tank.

Vast frontal areas of high mounted, flat fronted tankers cause wind resistance that not only causes more power and fuel to be consumed to move at a desired speed, but also increases instability and handling problems of the equipment. In addition, the configuration of a straight section or semi-straight section tank design dictates that the entire tank and lading be located above the running gear a distance sufficient to accommodate a sub-frame structure and to allow for the turning of the steering axles. Such an arrangement results in a relatively high center of gravity or roll. Due to the relatively deep V-shape of the tank 9 of the present invention and the graduation of width from a relatively narrow front to a relatively wider center section, wind resistance is reduced. In addition, the center portion of the tank 9 of the present invention is below the running gear, thereby presenting a lower frontal section and a semi-wedge shape to the front which can reduce the wind resistance, reduce power requirements, reduce fuel consumption, and increase performance. In addition, such a configuration contributes to the stability of the vehicle, particularly at high speed.

The relative dimensions, radii and slope angles of the trailer tank 9 of the present invention and the elimination of internal structural members and minimization of under-framing results in a relatively light, multi-purpose trailer tank. The trailer tank 9 of the present invention, in comparison to previously known tanks, is relatively shorter in span and deeper in its mid-section, thereby contributing significantly to its superior structural stability.

In a constructed embodiment of the present invention, the length of the shell 10, not including the ends 20 and 22, was 18 feet, the diameter of the ends 20 and 22 was 54 inches, the vertical height of the shell 10 at its mid-section, corresponding to the major axis of the elliptical shape, was 98 inches, and the width of the shell 10 at its mid-section corresponding to the minor axis of the elliptical shape was 72 inches. Accordingly, the slope of the bottom wall section is the ratio of 11 to 27. It can be appreciated, however, that these dimensions can be altered without departing from the teachings of the present invention.

I claim:

1. A trailer tank for transporting materials having fluid characteristics comprising:
    a. an outer shell forming an enclosure for receiving such materials and being formed of side, bottom, top and end walls, said side walls having a radius of curvature in a transverse plane which is greater than the radius of curvature in a transverse plane of said bottom wall and wherein said bottom wall is approximately V-shaped in a longitudinal plane; and
    b. means forming a discharge opening at the lowermost point of said bottom wall,
    the transverse cross-sectional-shape of said shell at approximately midpoint along the longitudinal axis thereof being approximately elliptical with the major axis thereof lying in a vertical plane and the eccentricity being such as to provide relatively steep sides for fast drainage.

2. A trailer tank as defined by claim 1, wherein the transvere cross-sections of said end walls are approximately circular and wherein successive transverse cross sections of said shell from respective ends to a midpoint along the longitudinal axis vary in a smooth transition from approximately circular to approximately elliptical.

3. A trailer tank as defined by claim 2, wherein said top wall is approximately straight in a longitudinal plane.

4. A trailer tank as defined by claim 3, wherein the slope of said bottom wall in a longitudinal plane is a ratio of approximately 11 units in a vertical plane to 27 units in a horizontal plane.

5. A trailer tank for transporting material having fluid characteristics comprising:
    an outer shell forming an enclosure for receiving such materials and being formed of side, bottom, top and end walls, and
    the transverse cross-sectional shape of said shell at approximately midpoint along the longitudinal axis thereof being approximately elliptical with the major axis thereof lying in a vertical plane and the eccentricity being such as to provide relatively steep sides for fast drainage.

6. A trailer tank as claimed in claim 5 wherein successive transverse cross-sections of said shell from respective ends to a midpoint along the longitudinal axis vary in a smooth transition from approximately circular to approximately elliptical.

7. A trailer tank as claimed in claim 6 wherein the transverse cross-sections of said end walls are approximately circular.

* * * * *